US009950626B2

(12) United States Patent
Otte et al.

(10) Patent No.: US 9,950,626 B2
(45) Date of Patent: Apr. 24, 2018

(54) OVERVOLTAGE PROTECTION FOR ACTIVE RECTIFIERS IN THE EVENT TO LOAD SHEDDING

(71) Applicant: SEG AUTOMOTIVE GERMANY GMBH, Stuttgart (DE)

(72) Inventors: Christopher Otte, Reutlingen (DE); Paul Mehringer, Stuttgart (DE)

(73) Assignee: SEG Automotive Germany GmbH, Stuttgart (DE)

( * ) Notice: Subject to any disclaimer, the term of this patent is extended or adjusted under 35 U.S.C. 154(b) by 200 days.

(21) Appl. No.: 14/905,244

(22) PCT Filed: Jun. 24, 2014

(86) PCT No.: PCT/EP2014/063230
§ 371 (c)(1),
(2) Date: Jan. 14, 2016

(87) PCT Pub. No.: WO2015/007467
PCT Pub. Date: Jan. 22, 2015

(65) Prior Publication Data
US 2016/0144724 A1  May 26, 2016

(30) Foreign Application Priority Data

Jul. 15, 2013 (DE) ........................ 10 2013 213 802

(51) Int. Cl.
*B60L 11/02* (2006.01)
*H02M 1/32* (2007.01)
(Continued)

(52) U.S. Cl.
CPC ............ *B60L 11/02* (2013.01); *H02H 7/1252* (2013.01); *H02M 1/32* (2013.01); *H02M 7/04* (2013.01);
(Continued)

(58) Field of Classification Search
CPC ......................................................... B60L 11/02
(Continued)

(56) References Cited

U.S. PATENT DOCUMENTS

2012/0007568 A1   1/2012   Horihata et al.
2013/0113283 A1*  5/2013   Shiek ..................... H02J 7/00
                                                         307/31

FOREIGN PATENT DOCUMENTS

CN      102712255 A    10/2012
DE      19835316       2/2000
(Continued)

OTHER PUBLICATIONS

International Search Report for PCT/EP2014/063230, dated Oct. 6, 2014.

*Primary Examiner* — Joseph Chang
(74) *Attorney, Agent, or Firm* — Norton Rose Fulbright US LLP; Gerard Messina

(57) ABSTRACT

A bridge rectifier having AC voltage terminals, two DC voltage terminals, and a number of half-bridges corresponding to the number of AC voltage terminals. Each half-bridge has two activatable switching elements, connected in series between the DC voltage terminals and between which one of the AC voltage terminals is connected in each case. Each half-bridge includes a control circuit configured to detect an output voltage applied between the DC voltage terminals and switch a first switching element of the two switching elements of the particular half-bridge to be conductive by activation using a first control signal until the output voltage falls below a lower threshold value, after it has previously exceeded an upper threshold value, and to activate it in a clocked manner by activation using a second control signal, until the output voltage exceeds the upper threshold value, after it has previously fallen below the lower threshold value.

11 Claims, 6 Drawing Sheets

(51) Int. Cl.
*H02M 7/219* (2006.01)
*H02H 7/125* (2006.01)
*H02M 7/04* (2006.01)

(52) U.S. Cl.
CPC ......... *H02M 7/219* (2013.01); *Y02B 70/1408* (2013.01)

(58) Field of Classification Search
USPC ....................................................... 307/10.1
See application file for complete search history.

(56) References Cited

FOREIGN PATENT DOCUMENTS

| | | |
|---|---|---|
| DE | 102009046952 | 5/2011 |
| DE | 102009046955 | 5/2011 |
| DE | 102011088973 | 6/2013 |
| EP | 0316608 | 5/1989 |
| EP | 0777309 | 6/1997 |
| JP | H04178170 A | 6/1992 |
| JP | H10127062 A | 5/1998 |
| JP | 2012019655 A | 1/2012 |

\* cited by examiner

OVERVOLTAGE PROTECTION FOR ACTIVE RECTIFIERS IN THE EVENT TO LOAD SHEDDING

FIELD

The present invention relates to an active bridge rectifier having means for protection from overvoltages in the event of load shedding, a motor vehicle electrical system having such a bridge rectifier, an associated operating method, and means for implementing this operating method.

BACKGROUND INFORMATION

Rectifiers of different designs may be used for supplying direct current systems from three-phase current systems. Bridge rectifiers in a six-pulse version are frequently used in motor vehicle electrical systems in accordance with the three-phase current systems typically installed therein. However, the present invention is similarly suitable for bridge rectifiers for other numbers of phases, for example, for five-phase generators.

One critical fault in the case of bridge rectifiers is load shedding (load dump). This occurs if, in the case of a highly excited generator and a correspondingly high emitted current, the load on the generator or the bridge rectifier connected thereto (for example, due to shutdown of consumers) is reduced suddenly and the load cannot be absorbed by capacitively acting elements in the DC voltage network (for example, the battery in the motor vehicle electrical system). In this case, energy could still be supplied into the motor vehicle electrical system by the generator or the bridge rectifier connected thereto, in the extreme case up to a period of approximately 300 ms to 500 ms. This energy has to be able to be absorbed in the bridge rectifier to protect electrical components in the motor vehicle electrical system from overvoltage damage. This is generally carried out in passive bridge rectifiers by the rectifier diodes installed therein, in which the excess energy may be converted into heat.

As explained in German Patent Application No. DE 10 2009 046 955 A1, for example, the use of active bridge rectifiers is desirable in motor vehicles, however, inter alia, because they have lower power losses in comparison to passive or uncontrolled bridge rectifiers. Presently available activatable or active switching elements for such active bridge rectifiers, for example, MOS field effect transistors, are not able to dissipate overvoltages like diodes, however. Therefore, additional protection strategies are required in active bridge rectifiers.

In the event of load shedding, for example, the generator phases may be briefly short-circuited by switching all switching elements of the upper or lower rectifier branch to be conductive, as disclosed, for example, in German Patent Application No. DE 198 35 316 A1 and discussed in German Patent Application No. DE 10 2009 046 955 A1. This takes place in particular on the basis of an analysis of the output voltage applied to the DC voltage terminals of the active bridge rectifier. If it exceeds a predefined upper threshold value, a corresponding short-circuit is initiated and the output voltage drops. If the output voltage thus falls below a predefined lower threshold value, the short-circuit is canceled again. The output voltage rises again. It is therefore typical hysteresis behavior. The output voltage therefore generally swings between the upper and the lower threshold values in the event of load shedding, until the voltage regulation has adapted to the new situation and has accordingly reduced the exciter field of the generator.

Problems may arise here in so-called decentralized active bridge rectifiers, in which the individual half-bridges each have independent control circuits, which each acquire the output voltage individually. Since certain tolerances are unavoidable in this case, different switching behavior may take place in the individual half-bridges, as explained below. Hence, individual switching elements in the active bridge rectifier may be significantly overloaded, which may result in thermal destruction of the corresponding switching elements and a failure.

The demand therefore exists for improved protection strategies for active bridge rectifiers in the event of load shedding.

SUMMARY

The present invention introduces an active bridge rectifier having means for protection from overvoltages in the event of load shedding, a motor vehicle electrical system having such a bridge rectifier, an associated operating method, and means for implementing this operating method.

As mentioned, the present invention relates to the operation of an active bridge rectifier in the event of load shedding. As explained, such operation may include connecting the generator phases or the AC voltage terminals of the active bridge rectifier corresponding thereto to be conductive (to short-circuit them) upon exceedance of an upper threshold value by simultaneously activating (and therefore simultaneously switching to be conductive) all activatable or active switching elements of a rectifier branch, and accordingly simultaneously again canceling short-circuits upon a fall below a lower threshold value. In the mentioned, decentralized active bridge rectifiers, in which the individual half-bridges each have independent control circuits, which each individually acquire the output voltage applied to the DC voltage terminals of the active bridge rectifier, such operation is sought, but is not always achieved in the related art due to the above-explained tolerances in the voltage recognition and/or downstream elements of the control circuits. In contrast, the measures according to the present invention enable such operation in a particularly advantageous way.

Due to the mentioned tolerances, the threshold values may turn out to be variable, for example, due to deviations between the comparator circuits.

The case in which the lower threshold values are variable has proven to be particularly critical. Because the control circuits of all other half-bridges resume the normal operation before the control circuit having the effective lowest lower threshold value, the output voltage rises again. The control circuit having the effective lowest lower threshold value may therefore never detect an output voltage below this effective lowest lower threshold value. The correspondingly activated switching element therefore permanently remains switched to be conductive.

Under certain circumstances, individual phases resume the normal rectification, while others permanently remain short-circuited. This behavior results in an asymmetry of the resulting phase currents, as illustrated in FIGS. 3 through 5 explained below. As a result of this, individual switching elements in the rectifier may be significantly overloaded, which may result in thermal destruction of the corresponding switching elements. Premature failure of the active bridge rectifier or insufficient limiting of the overvoltages caused by the load shedding is therefore possible.

An active bridge rectifier has half-bridges, the particular switching elements of which define an upper and a lower or high-side and low-side rectifier branch. In each case, a connection of one or multiple AC voltage terminals to a positive DC voltage terminal may be established with the aid of the switching elements situated in the upper or high-side rectifier branch and a connection of one or multiple AC voltage terminals to a negative DC voltage terminal may be established with the aid of the switching elements situated in the lower or low-side rectifier branch. Each half-bridge thus has two activatable switching elements, which are connected in series between the two rectifier terminals, and between which one of the AC voltage terminals is connected in each case.

With the aid of the AC voltage terminals, the active bridge rectifier is connected to a corresponding number of generator phases, the DC voltage terminals supply a DC voltage vehicle electrical system. The negative DC voltage terminal may be at ground in particular. An output voltage, which may correspond to the vehicle electrical system voltage of a connected vehicle electrical system, is applied to the DC voltage terminals during rectifying operation of the active bridge rectifier. Active bridge rectifiers may accordingly also be operated as inverters, for example, in hybrid vehicles for commutating an electric motor. Such operating phases are not considered here. However, when a generator is referred to within the scope of the present invention, it may also be an electric machine which is operable both as a generator and as a motor. This also applies accordingly to the active rectifier, which may also be operable as an inverter in corresponding operating phases for commutation. The present invention relates, as previously mentioned, to a so-called decentralized bridge rectifier, in which each half-bridge includes a control circuit, which is configured to acquire an output voltage applied between the two DC voltage terminals. It is furthermore configured to switch a first switching element of the two switching elements of the particular half-bridge to be conductive by activation using a first control signal, until the output voltage falls below a lower threshold value, after it has previously exceeded an upper threshold value, and to activate it in a clocked manner by activation using a second control signal until the output voltage exceeds the upper threshold value, after it has previously fallen below the lower threshold value.

The first switching element is the switching element which is provided for initiating or canceling a corresponding phase short-circuit. The particular other switching element is referred to as the second switching element. The present invention will predominantly be described hereafter with reference to the activation of a first switching element in the lower or low-side rectifier branch using the first control signal, but may also be used in the same way for an activation of a corresponding switching element in an upper or high-side rectifier branch.

The first control signal is therefore used when load shedding is detected. This detection takes place by way of a threshold value comparison in the control circuit. The first control signal is preferably a permanent signal, which causes the first switching element to be permanently set into a conductive state, i.e., it establishes a conductive connection between the particular AC voltage terminal connected to the half-bridge and one of the two DC voltage terminals as long as a corresponding first control signal is applied. The second control signal is in particular a control signal which is used for activating a corresponding bridge rectifier in normal rectifier operation. This control signal is therefore clocked by pulse width modulation. It may optionally also be provided by a higher-order control unit, the particular control circuit being configured to relay the control signal provided by the higher-order control unit to the particular first switching element.

According to the present invention, each control circuit is equipped with threshold value element, which is configured to effectuate a change of the lower and/or the upper threshold value after the output voltage has previously fallen below or exceeded the upper threshold value. The threshold value element may be designed as analog or digital threshold value element.

As explained, a typical problem in the use of half-bridge-individual control circuits in decentralized rectifiers is that the control circuit having the effective lowest lower threshold value may never acquire an output voltage below this threshold value. The correspondingly activated switching element therefore remains continuously switched to be conductive without the measures according to the present invention.

In contrast, the present invention enables a change of the lower and/or the upper threshold value to be caused in such cases. In this case, it may be provided, for example, that the lower threshold value is raised successively (i.e., for example, step-by-step or continuously) after the particular switching element is switched to be conductive. This may be carried out, for example, with the aid of a circuit as explained below with reference to FIG. 7. By way of these measures, in at least one of the subsequent cycles of the initiation and cancellation of the phase short-circuit, the lower threshold value of this control circuit may also be reached (fallen below), so that this control circuit may also move back into normal operation.

To distribute the loads uniformly onto all phases in spite of varying upper and lower threshold values, after the upper threshold value is exceeded in a control circuit, this upper threshold value may also be set higher, for example, by a defined increment. If an exceedance of the upper threshold value is detected again within a predefined time window (filter time), it may again be raised, for example, again by an increment, and otherwise it may be reduced accordingly. In the steady state, the upper threshold values are thus alternately raised and reduced. The particular switching elements are thus alternately switched to be conductive and switched to be nonconductive. The effective upper threshold values are therefore in a narrow range in all phases, which is specified, for example, by the size of the incremental value for the upper threshold value.

The measures which were just explained also relate to measures with respect to the lower threshold value, of course, which may in particular be raised or reduced in synchronization with the upper threshold value.

One particularly advantageous embodiment of the method according to the present invention includes the use of dead times in the phase-individual control circuits. Such a dead time has the effect that the particular control circuit does not immediately output the control signal to the switching element provided for this purpose when it detects a corresponding event, but rather only after a predefined time window has elapsed. A corresponding dead time may be implemented both upon recognition of an exceedance of the upper threshold value and upon a fall below the lower threshold value. Thus, for example, if the output voltage rises, the control circuit having the (effective) lowest upper threshold value first detects an exceedance of this threshold value. However, it does not immediately switch the switching element provided for this purpose to be conductive, but rather initially "waits" for the dead time to elapse. The output voltage therefore rises further during the dead time, until the switching elements having the (effective) higher upper threshold values (in which a corresponding dead time is also implemented) detect that the threshold value is exceeded. Protective circuitry of all switching elements is therefore ensured. The switching element having the (effective) highest lower threshold value accordingly also first detects a drop of the output voltage. Here also, the output voltage does not immediately activate the switching element provided for this purpose, but rather initially "waits" for the dead time to elapse. The output voltage therefore drops further during the dead time, until the switching elements having the (effective) lowermost lower threshold values (in which a corresponding dead time is also implemented), also detect a fall below the threshold value. The dead time may be implemented circuitry-wise, for example, with the aid of an RC element at the output of a comparator which is used or with the aid of a digital counter. It is to be selected in such a way that the individual differences (tolerances) in the phase-individual control circuits are compensated for reliably, but the output voltage does not assume critically high or low values.

The features explained herein and the advantages thus achievable relate in the same way to the active bridge rectifier according to the present invention, the motor vehicle electrical system according to the present invention having such a bridge rectifier, the operating method according to the present invention, and the means according to the present invention for implementing this operating method.

A processing unit according to the present invention, for example, a control unit of a motor vehicle or a rectifier controller is configured, in particular by programming, to carry out a method according to the present invention.

The implementation of the method in the form of software is also advantageous, since it involves particularly low costs, in particular if an executing control unit is also used for other tasks and is therefore present in any case. Suitable data carriers for providing the computer program are in particular diskettes, hard drives, flash memories, EEPROMs, CD-ROMs, DVDs, etc. A download of a program via computer networks (Internet, intranet, etc.) is also possible.

Further advantages and example embodiments of the present invention result from the description and the figures.

It shall be understood that the above-mentioned features and the features to be explained hereafter are usable not only in the particular specified combination but rather also in other combinations or alone, without departing from the scope of the present invention.

The present invention is schematically shown on the basis of an exemplary embodiment in the figures and is described in detail hereafter with reference to the figures.

BRIEF DESCRIPTION OF THE DRAWINGS

In the figures, identical or corresponding elements are indicated with identical reference numerals. A repeated explanation is omitted.

DETAILED DESCRIPTION OF EXAMPLE EMBODIMENT

Figure 1A:
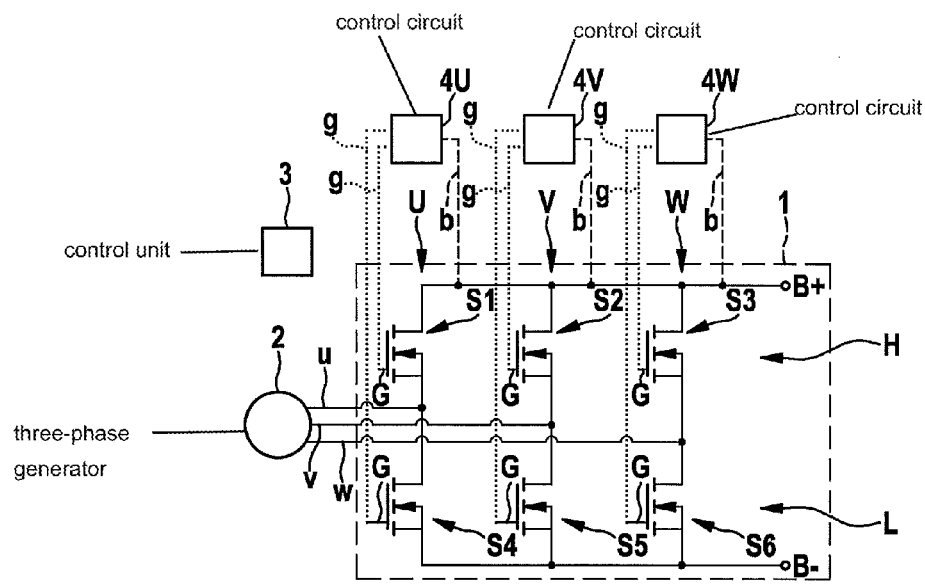
FIGS. 1A through 1C—show arrangements having active bridge rectifiers and the function thereof in schematic views.
Figure 1B:
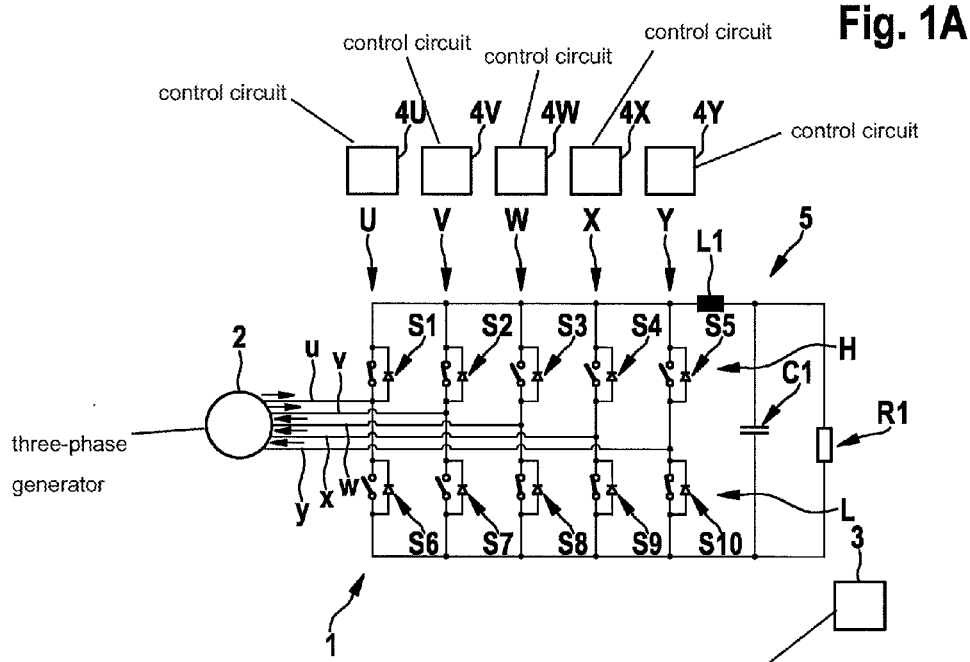
Figure 1C:
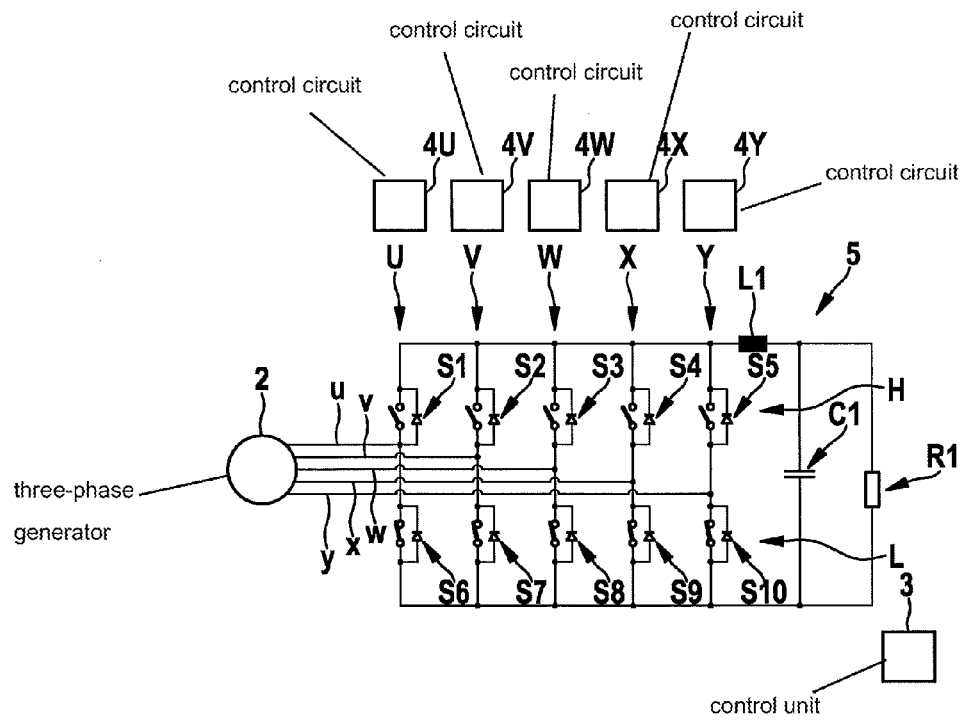

FIGS. 1A through 1C show arrangements having active bridge rectifiers and the function thereof in schematic views.

FIG. 1A schematically shows an arrangement having an active bridge rectifier 1 and a generator 2 on the example of a three-phase system. In FIG. 1A, active bridge rectifier 1 is shown as a six-pulse active bridge rectifier 1, which is configured for rectifying a three-phase current of a three-phase generator 2. In the same way, however, a four-phase, five-phase, six-phase, or seven-phase generator 2 and a correspondingly adapted active bridge rectifier 1 may also be used. FIGS. 1B and 1C show, for example, an arrangement having a five-phase generator 2 and a corresponding active bridge rectifier 1.

Active bridge rectifier 1 has three half-bridges U, V, and W, which are connected via AC voltage terminals u, v, and w of active bridge rectifier 1 to corresponding outputs of generator 2, and therefore to the particular generator windings.

Half-bridges U, V, and W are connected at the output, i.e., via corresponding DC voltage terminals B+ and B− of active bridge rectifier 1, for example, to a positive battery pole (B+) and a negative battery pole (B−) and/or to corresponding supply lines of a DC voltage network. DC voltage terminal B− may be connected to ground. Half-bridges U, V, and W each have activatable or active switching elements S1 through S6, which are each incorporated in an upper branch H (high-side) and a lower branch L (low-side) of particular half-bridges U, V, and W.

One of AC voltage terminals u, v, w may be connected, according to a corresponding protective circuitry of switching elements S1 through S6, to B+ and/or B−; a simultaneous activation of both switching elements of a half-bridge U, V, and W (i.e., S1/S4, S2/S5, and S3/S6) is to be avoided during normal operation, to prevent so-called hot paths between the two DC voltage terminals B+ and B−.

A control unit 3 may be provided for activating active bridge rectifier 1. In decentralized active bridge rectifier 1 shown here, however, individual control circuits, identified here with 4U through 4W, assume at least a part of the required switching tasks of particular half-bridges U, V, and W. A control signal may be applied to switching elements S1 through S6 via the particular gate terminals G thereof via lines g, which are shown by dotted lines, with the aid of individual control circuits 4U through 4W. The activation pattern may be specified, for example, by control unit 3.

The switching elements of a half-bridge U, V, and W (i.e., S1/S4, S2/S5, and S3/S6) are activated during normal operation of the arrangement shown in such a way that a current signal, which is applied to a corresponding AC voltage terminal u, v, and w, of a generator winding connected thereto of generator 2 is alternately advanced to one of the two DC voltage terminals B+ and B−. This is regularly carried out in such a way that upon application of a positive half-wave to AC voltage terminals u, v, and w, the particular signal is advanced to DC voltage terminal B+, in contrast, upon application of a negative half-wave, the signal is advanced to DC voltage terminal B−. An output voltage at DC voltage terminal B+ may also be set by corresponding clocking.

Load shedding may be detected in an arrangement shown in FIG. 1A on the basis of a voltage applied between DC voltage terminals B+ and B−. For this purpose, in the illustrated example, individual control circuits 4U through 4W are configured as explained below with reference to FIG. 4A. Individual control circuits 4U through 4W are connected via lines b to at least one DC-voltage-side output of active bridge rectifier 1, to the output connected to B+ here. If a defined threshold value of the voltage applied to this DC-voltage-side output of active bridge rectifier 1 is exceeded, load shedding may be detected. It shall be understood that individual control circuits 4U through 4W for voltage recognition may furthermore be connected to a reference potential, for example, the other DC voltage terminal or ground.

The activation of active bridge rectifier 1 if load shedding is detected may be carried out in such a way that the phase windings of generator 2, which are each connected via one of AC voltage terminals u, v, and w to half-bridges U, V, and W of active bridge rectifier 1, are short-circuited in a chronologically defined way. As a result, the current fed into the vehicle electrical system drops to zero. A corresponding short-circuit may be produced by simultaneously activating and therefore switching to be conductive switching elements S1 through S3 or S4 through S6 of one rectifier branch H or L in each case. If the short-circuit is canceled, the current rises again. This sequence may be used in a transition phase to regulate the output voltage of generator 2, until the normal regulation via the generator regulator engages again. As mentioned, this does not take place reliably according to the related art upon use of individual analysis circuits 4U through 4W. The resulting negative effects are illustrated below with reference to FIGS. 3 and 5. An approach according to one specific embodiment of the present invention in the form of an adapted individual analysis circuit 4U is illustrated below with reference to FIG. 7.

FIGS. 1B and 1C each show arrangements having a five-phase generator 2 and an active bridge rectifier 1 including five half-bridges. The inputs are identified with u through y, the half-bridges are identified accordingly with U through Y, and individual control circuits are identified with 4U through 4X. Lines b and g were not shown for the sake of clarity. Half-bridges U through Y each include switching elements S1 to S10. Switching elements S1 through S10 are illustrated as switches having a diode connected in parallel, in reality, however, they are designed as MOS field effect transistors as in FIG. 1A. Otherwise, the arrangements of FIGS. 1B and 1C correspond to those of FIG. 1A.

A vehicle electrical system capacitance C1 and a resistive load R1 are situated in a downstream vehicle electrical system 4. The resistive load corresponds, for example, to a consumer in vehicle electrical system 4. A line inductance L1 results due to the lines in vehicle electrical system 4.

FIG. 1B shows an instantaneous state of a normal operation of the corresponding arrangement. It is assumed here that at this point in time a current flows via AC voltage terminals u and v from the generator into the active bridge rectifier, while a current flows from the active bridge rectifier into the generator via AC voltage terminals w, x, and y. Switching elements S1 and S2 establish a conductive connection of AC voltage terminals u and v to DC voltage terminal B+ by appropriate activation. Switching elements S8, S9, and S10 establish a conductive connection of AC voltage terminals w, x, and y to DC voltage terminal B−. A positive voltage potential is applied to AC voltage terminals u and v for the corresponding moment, while in contrast a negative voltage potential is applied to AC voltage terminals w, x, and y. The current supplied by the generator becomes excessively high in the event of load shedding and is 150 A, for example.

Since a vehicle electrical system capacitor C1 is provided in the present case, a part of the current, for example, 130 A, flows into it and charges it. The remaining fraction, 20 A here, flows into actual vehicle electrical system 4 or resistive load R1.

To avoid excessively high vehicle electrical system voltages in the event of load shedding, a switching state may be set periodically, as shown in FIG. 1C. All switching elements S6 through S10 of lower rectifier branch L are switched to be conductive here. Alternatively, it is also possible to establish the conductive connection to switching elements S1 through S5. AC voltage terminals u through y and therefore the corresponding generator phases are conductively connected to one another in this way (short-circuited). Current no longer flows from generator 2 into active bridge rectifier 1. Vehicle electrical system 4 is exclusively fed from vehicle electrical system capacitance C1 in this switching state. The switching state of FIG. 1C is set until a voltage between DC voltage terminals B+ and B− is again below a permissible value. The switching state of FIG. 1B is then set again, until the voltage between DC voltage terminals B+ and B− again exceeds the permissible value, etc.

Figure 2:
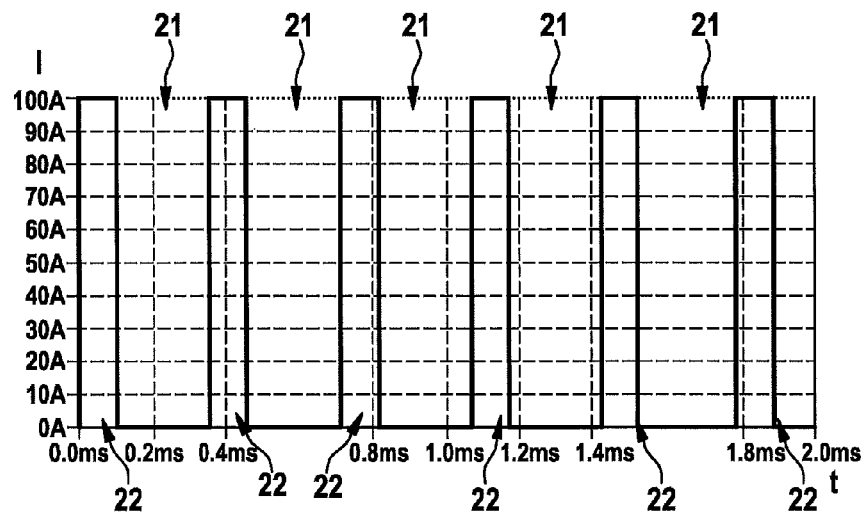
FIG. 2—shows a current curve during an activation of an active bridge rectifier in the event of load shedding.

FIG. 2 shows a generator current curve during such an activation of an active bridge rectifier 1 in the event of load shedding according to the related art. In the illustrated diagram, the generator current curve is plotted as current I in amperes on the y axis against a time t in milliseconds on the x axis.

As explained in conjunction with FIG. 1A, within the scope of a conventional activation, in the event of load shedding, switching elements S1 through S3 and S4 through S6 (or switching elements S1 through S5 and S6 through S10 according to FIGS. 1B and 1C) of one rectifier branch H or L in each case are activated simultaneously during specific periods of time 21, and the AC voltage terminals are therefore short-circuited. No current is therefore emitted into vehicle electrical system 4. During periods of time 22, in contrast, the short-circuit is canceled and a current is emitted into vehicle electrical system 4 as in regular rectifier operation.

Figure 3:
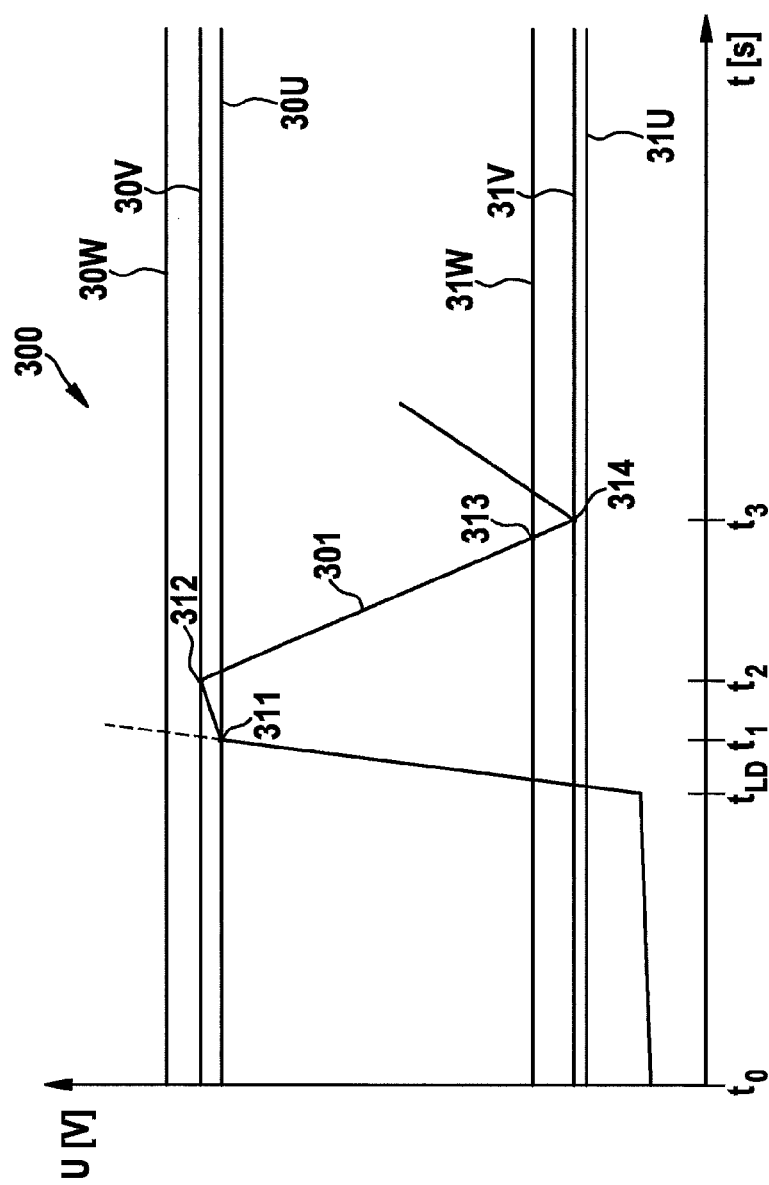
FIG. 3—illustrates a voltage curve on an active bridge rectifier according to the related art.

FIG. 3 shows a voltage curve at positive DC voltage terminal B+ in a three-phase active bridge rectifier according to the related art, the half-bridges of which, as illustrated with reference to FIG. 1A, have individual control circuits. In this case, the individual control circuits or corresponding analysis circuits react slightly differently in each phase, which accordingly results in different threshold values for phases U, V, and W. However, these explanations apply in the same way for a five-phase active bridge rectifier as illustrated in FIGS. 1B and 1C.

In FIG. 3, in each case upper threshold values of the individual control circuits of half-bridges U through W (cf. control circuits 4U through 4W of FIG. 1A) of a corresponding rectifier are identified with 30U through 30W, and the lower threshold values are accordingly identified with 31U through 31W. It is apparent that the upper and the lower threshold values of the control circuit of half-bridge W, 30W and 31W, are significantly greater than the threshold values of the control circuit of half-bridge V, 30V and 31V, which are in turn greater than the threshold values of the control circuits of half-bridge U, 30U and 31U.

A voltage curve 301, as is applied, for example, to a DC voltage terminal of such an active bridge rectifier, for example, DC voltage terminal B+, as voltage value U is plotted in a diagram 300 in volts on the ordinate in relation to a time t in seconds on the abscissa.

Regular operation takes place between points in time t0 and tLD, the voltage value of voltage curve 301 is in a range which is typical in the event of rectification and corresponds, for example, to a setpoint voltage for a vehicle electrical system, for example, 12 V. The corresponding active bridge rectifier is therefore in regular rectifier operation. At a point in time tLD, load shedding takes place, for example, due to switching off of a consumer in the vehicle electrical system. The voltage value of voltage curve 301 rises suddenly.

At a point 311, the voltage value of voltage curve 301 reaches upper threshold value 30U of the control circuit of half-bridge U. The switching element of this half-bridge U provided for this purpose, for example, the low-side switching element (cf. switching element S4 in FIG. 1) is therefore switched to be conductive. The voltage increase thus flattens out, but still reaches upper threshold value 30V of the control circuit of half bridge V at a point 312. The switching element of this half-bridge V (cf. switching element S5 in FIG. 1) provided for this purpose is thus also switched to be conductive. As a result of this, the voltage value of voltage curve 310 drops. Upper threshold value 30W of the control circuit of half-bridge W, 30W, is therefore no longer reached, so that the corresponding switching element of this half-bridge W (cf. switching element S6 in FIG. 1), remains in the regular activation, for example, a clocked activation, which it also experiences between points in time t0 and tLD.

At a point 313, the voltage value of voltage curve 301 reaches lower threshold value 31W of the control circuit of half-bridge W. However, since it has not previously initiated a conductive state of the corresponding switching element, no change results here.

At a point 314, however, the voltage value of voltage curve 301 reaches lower threshold value 31V of the control circuit of half-bridge V. The control circuit of half-bridge V now cancels the permanently conductive state of the corresponding switching element and returns to regular activation, for example, a clocked activation, which also takes place between points in time t0 and tLD, so that only the switching element activated by the control circuit of half-bridge U still remains in the permanently conductive state.

However, since only this one switching element is switched to be permanently conductive, the voltage value of voltage curve 301 increases again. The switching element activated by the control circuit of half-bridge U therefore may no longer arrive in regular activation, since lower threshold value 31 is no longer reached.

Figure 4:
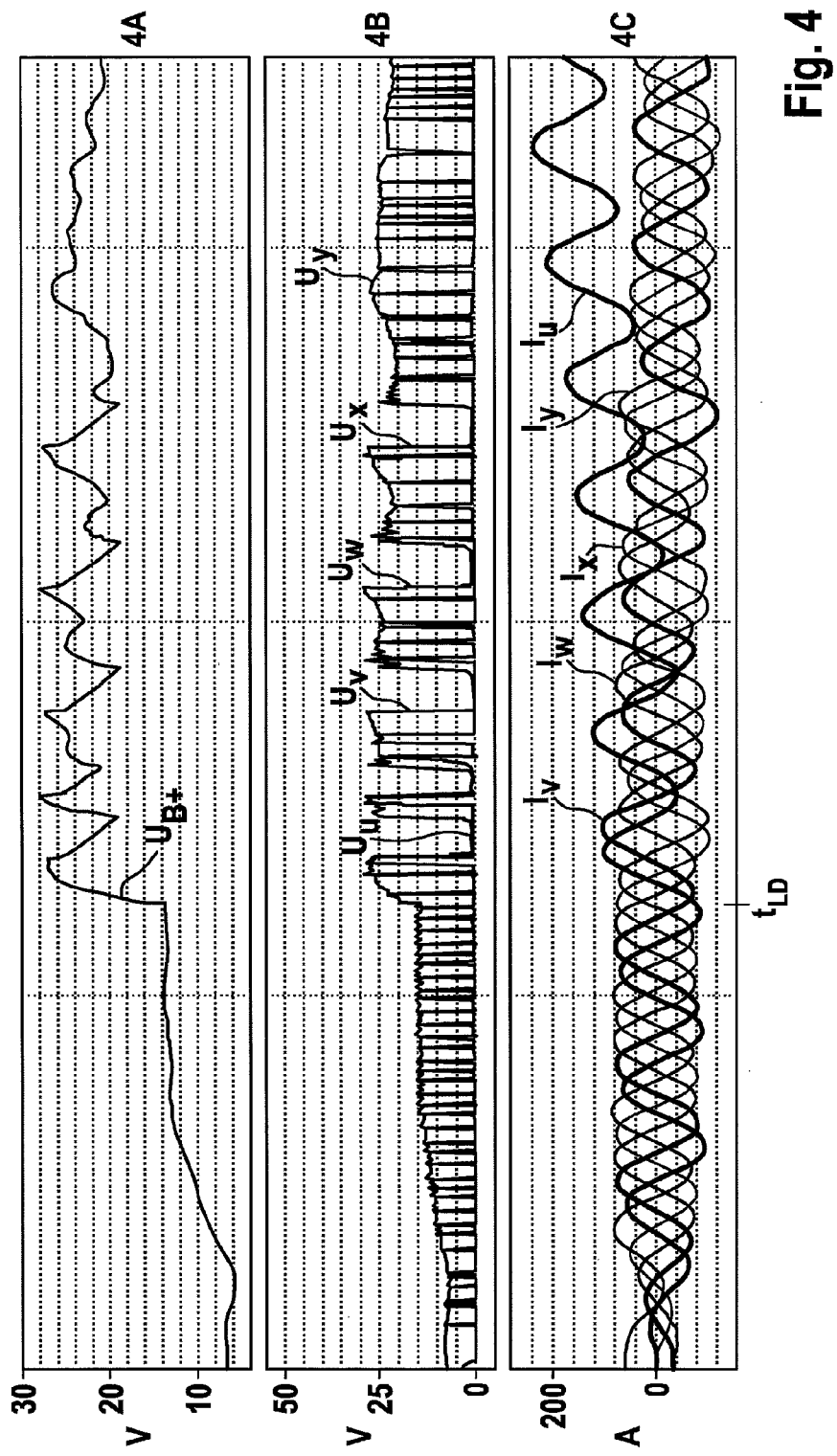
FIG. 4—shows current and voltage curves on an active bridge rectifier according to the related art.

The effects resulting therefrom on the current and voltage curves of a corresponding active five-phase rectifier according to the related art are illustrated in FIG. 4. In FIG. 4, a voltage curve UB+ at a DC-voltage-side output of an active bridge rectifier, B+ here, in volts is shown in a partial diagram 4A, curves of phase voltages Uu through Uy in volts are shown in a partial diagram 4B, and correspondingly phase currents Iu through Iy in amperes are shown in a partial diagram 4C, on the ordinate in relation to a shared time axis t in seconds on the abscissa. As is apparent, the related art also enables limiting of output voltage UB+ in the event of load shedding, however, in phase U, as a result of the fact that the switching element activated by the control circuit of half-bridge U may no longer come into regular activation here, since lower threshold value 31 is no longer reached, high currents occur (partial diagram 4D, Iu), which strongly load the corresponding switching element.

Figure 5:
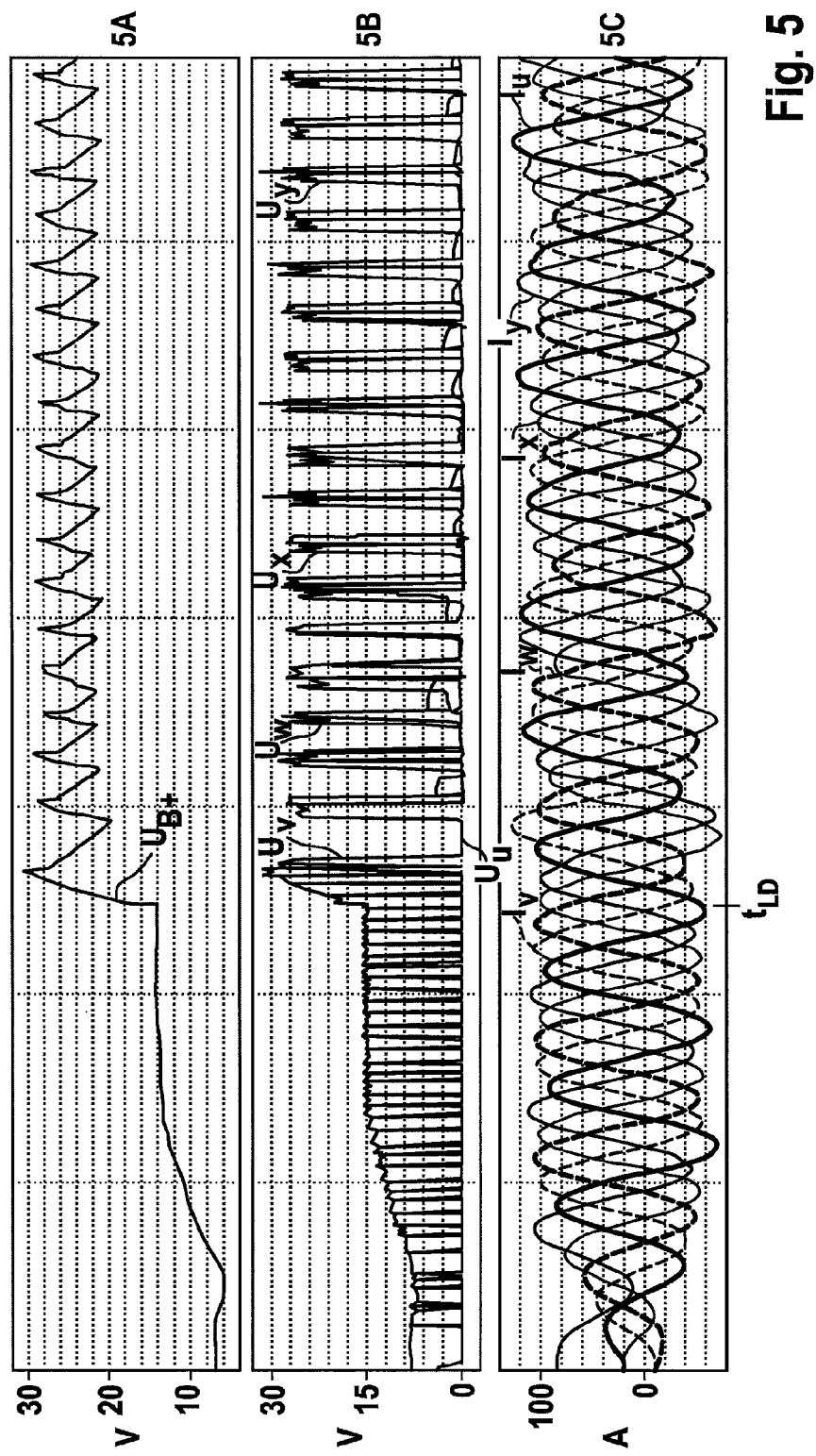
FIG. 5—shows current and voltage curves on an active bridge rectifier according to one specific embodiment of the present invention.

In contrast, if one successively lowers the lower threshold value in a corresponding control circuit, after the permanently conductive state was initiated, the switching element activated by the control circuit of half-bridge U may come back into the regular activation. This is provided according to one specific embodiment of the present invention. The effects are shown in FIG. 5. The illustration corresponds to FIG. 4. None of phase currents Iu to Iy reach a critical value here, and the switching elements are prevented from damage.

Figure 6:
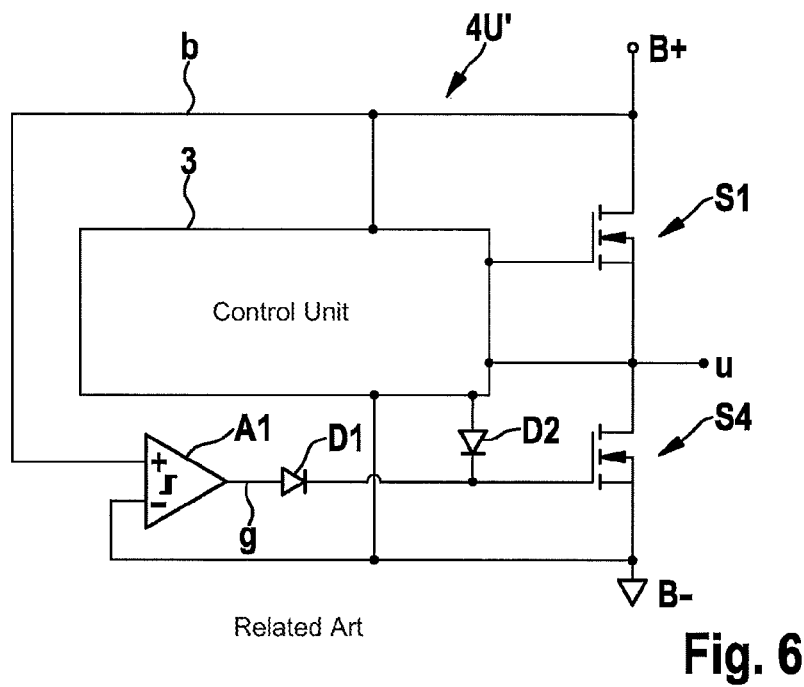
FIG. 6—shows a control circuit according to the related art in a schematic illustration.

FIG. 6 shows a control circuit according to the related art in a schematic view. The control circuit is identified as a whole with 4U' and is used, for example, in an active bridge rectifier 1, as shown in FIGS. 1A through 1C. A corresponding control circuit may be constructed identically for all phases U through W or Y.

In control circuit 4U, a hysteresis circuit A1 is connected at its inputs (+ and −) to DC voltage terminals B+ and B− (or ground) of active bridge rectifier 1. Hysteresis circuit A1 may therefore analyze a voltage applied between DC voltage terminals B+ and B− (or ground). If it exceeds an upper threshold value (corresponding to point 311 of FIG. 3), a voltage is applied to the output of hysteresis circuit A1, via which active switching element S2 is set into the conductive state via a diode D1.

After falling below a lower threshold value (if it is reached), a signal is no longer applied to the output of hysteresis circuit A1. Active switching element S2 is now only activated by a signal of control unit 3 via a diode D2. Control unit 3 furthermore has lines for analyzing the voltage applied between DC voltage terminals B+ and B− (or ground) and the phase voltage and a further activation line for activating active switching element S1. In normal rectifier operation, control unit 3 activates switching elements S1 and S2 via the corresponding lines in a clocked manner.

Figure 7:
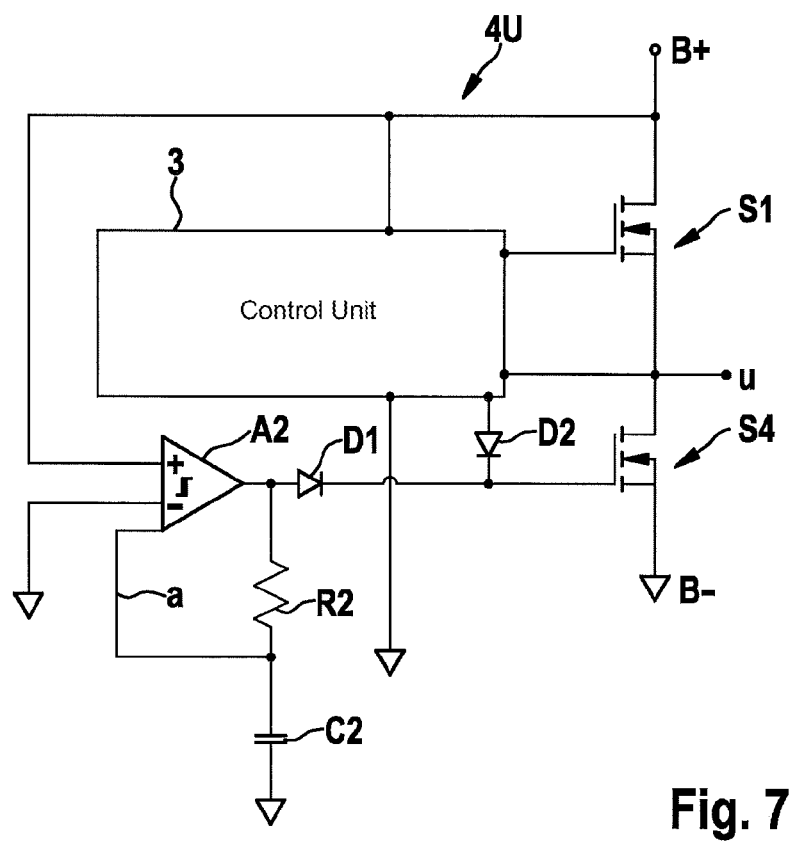
FIG. 7—shows a control circuit according to one specific embodiment of the present invention in a schematic view.

FIG. 7 shows a control circuit according to one specific embodiment of the present invention in a schematic view. It is identified with 4U and has the essential components of control circuit 4U' (cf. FIG. 6). A corresponding control circuit for all phases U through W or Y may also be constructed identically here.

However, a hysteresis circuit A2 deviating from control circuit 4U' is provided in control circuit 4U, which has an RC element, including a resistor R2 and a capacitor C2. If a signal is applied to the output of hysteresis circuit A2, capacitor C2 is charged via resistor R2. Hysteresis circuit A2 is configured with the aid of a line a to shift its threshold values upward by applying a voltage to this line. This is carried out successively by the RC element from the point in time at which the upper threshold value is exceeded at hysteresis circuit A2. The lower threshold value of hysteresis circuit A2 is thus continuously increased. Since a rectangular signal is always applied at the output of hysteresis circuit A2 ("high" for short circuit and "low" for normal operation), the shifting of the threshold values becomes particularly relevant for phases in which the short-circuit state is maintained for a very long time. An overlaid control loop is built up in this way, which ensures that phases, for example, phase U in diagram 4C, reach the lower threshold value again and deactivate the short-circuit.

What is claimed is:

1. A bridge rectifier comprising:
   a number of AC voltage terminals;

two DC voltage terminals; and a number of half-bridges corresponding to the number of AC voltage terminals, each half-bridge having two activatable switching elements, which are connected in series between the two DC voltage terminals, and between which one of the AC voltage terminals is connected in each case, and each half-bridge including a control circuit configured to acquire an output voltage applied between the two DC voltage terminals and to switch a first switching element of the two switching elements of the particular half-bridge (i) to be conductive by activation using a first control signal, until the output voltage falls below a lower threshold value, after it has previously exceeded an upper threshold value, and ii) to activate it in a clocked manner by activation using a second control signal, until the output voltage exceeds the upper threshold value, after it has previously fallen below the lower threshold value;

wherein each control circuit has a threshold value element which is configured to effectuate a change of at least one of the lower and upper threshold value after the output voltage has previously exceeded the upper threshold value.

2. The bridge rectifier as recited in claim 1, wherein the threshold value element is configured to successively increase the lower threshold value from a point in time at which the output voltage has exceeded the upper threshold value.

3. The bridge rectifier as recited in claim 2, wherein the threshold value element include a comparator designed as a hysteresis circuit, which has a threshold value input, which is connected to an RC element, which is connected to an output of the comparator.

4. The bridge rectifier as recited in claim 1, wherein the threshold value element is configured to always increase at least the upper threshold value if the output voltage exceeds the upper threshold value at least two times within a predefined time window, and to always reduce it if the output voltage exceeds the upper threshold value only once within the predefined time window.

5. The bridge rectifier as recited in claim 4, wherein the threshold value element is configured to increase or reduce at least the upper threshold value by a predefined increment.

6. The bridge rectifier as recited in claim 1, further comprising:

a control unit, configured to provide the second control signal to at least one of the control circuits and the activatable switching elements.

7. A motor vehicle electrical system having a bridge rectifier, the bridge rectifier comprising:

a number of AC voltage terminals;

two DC voltage terminals; and a number of half-bridges corresponding to the number of AC voltage terminals, each half-bridge having two activatable switching elements, which are connected in series between the two DC voltage terminals, and between which one of the AC voltage terminals is connected in each case, and each half-bridge including a control circuit configured to acquire an output voltage applied between the two DC voltage terminals and to switch a first switching element of the two switching elements of the particular half-bridge (i) to be conductive by activation using a first control signal, until the output voltage falls below a lower threshold value, after it has previously exceeded an upper threshold value (30U-30W), and ii) to activate it in a clocked manner by activation using a second control signal, until the output voltage exceeds the upper threshold value, after it has previously fallen below the lower threshold value;

wherein each control circuit has threshold value element, which is configured to effectuate a change of at least one of the lower and upper threshold value after the output voltage has previously exceeded the upper threshold value; and wherein the AC voltage terminals are connected to phase terminals of a generator and the two DC voltage terminals are configured to supply at least one consumer in the vehicle electrical system.

8. The motor vehicle electrical system as recited in claim 7, further comprising:

at least one of a vehicle electrical system capacitance, and an inductance.

9. A method for operating a bridge rectifier, the bridge rectifier including a number of AC voltage terminals, two DC voltage terminals, and a number of half-bridges corresponding to the number of AC voltage terminals, each half-bridge having two activatable switching elements, which are connected in series between the two DC voltage terminals, and between which one of the AC voltage terminals is connected in each case, and each half-bridge including a control circuit configured to acquire an output voltage applied between the two DC voltage terminals and to switch a first switching element of the two switching elements of the particular half-bridge, the method comprising:

in the event of load shedding, switching to be conductive a first switching element of the two switching elements of at least two of the half-bridges by activation with the aid of a first control signal, until the output voltage falls below a lower threshold value, after it has previously exceeded an upper threshold value, and to activate it in a clocked manner by activation with the aid of a second control signal until the output voltage has exceeded the upper threshold value, after it has previously fallen below the lower threshold value, and in each case a change of at least one of the lower and the upper threshold value of the corresponding control circuit being effectuated after the output voltage has previously exceeded the upper threshold value.

10. A control unit for a bridge rectifier, the bridge rectifier including a number of AC voltage terminals, two DC voltage terminals, and a number of half-bridges corresponding to the number of AC voltage terminals, each half-bridge having two activatable switching elements, which are connected in series between the two DC voltage terminals, and between which one of the AC voltage terminals is connected in each case, and each half-bridge including a control circuit configured to acquire an output voltage applied between the two DC voltage terminals and to switch a first switching element of the two switching elements of the particular half-bridge, the control unit configured to perform:

in the event of load shedding, switching to be conductive a first switching element of the two switching elements of at least two of the half-bridges by activation with the aid of a first control signal, until the output voltage falls below a lower threshold value, after it has previously exceeded an upper threshold value, and to activate it in a clocked manner by activation with the aid of a second control signal until the output voltage has exceeded the upper threshold value, after it has previously fallen below the lower threshold value, and in each case a change of at least one of the lower and the upper threshold value of the corresponding control circuit being effectuated after the output voltage has previously exceeded the upper threshold value.

11. A computer readable store medium storing the computer program for operating a bridge rectifier, the bridge rectifier including a number of AC voltage terminals, two DC voltage terminals, and a number of half-bridges corresponding to the number of AC voltage terminals, each half-bridge having two activatable switching elements, which are connected in series between the two DC voltage terminals, and between which one of the AC voltage terminals is connected in each case, and each half-bridge including a control circuit configured to acquire an output voltage applied between the two DC voltage terminals and to switch a first switching element of the two switching elements of the particular half-bridge, the computer program, when executed by a processing unit, causing the processing unit to cause:

in the event of load shedding, switching to be conductive a first switching element of the two switching elements of at least two of the half-bridges by activation with the aid of a first control signal, until the output voltage falls below a lower threshold value, after it has previously exceeded an upper threshold value, and to activate it in a clocked manner by activation with the aid of a second control signal until the output voltage has exceeded the upper threshold value, after it has previously fallen below the lower threshold value, and in each case a change of at least one of the lower and the upper threshold value of the corresponding control circuit being effectuated after the output voltage has previously exceeded the upper threshold value.

* * * * *